April 29, 1947. E. BODMER 2,419,704
DEVICE FOR AUTOMATIC LATHE
Filed Aug. 26, 1943 5 Sheets-Sheet 1

Inventor:
ERNEST BODMER
By Wilchauster & Groff
Attorneys

April 29, 1947. E. BODMER 2,419,704
DEVICE FOR AUTOMATIC LATHE
Filed Aug. 26, 1943 5 Sheets-Sheet 2

INVENTOR
ERNEST BODMER
By Wachensleen Graff
Attys

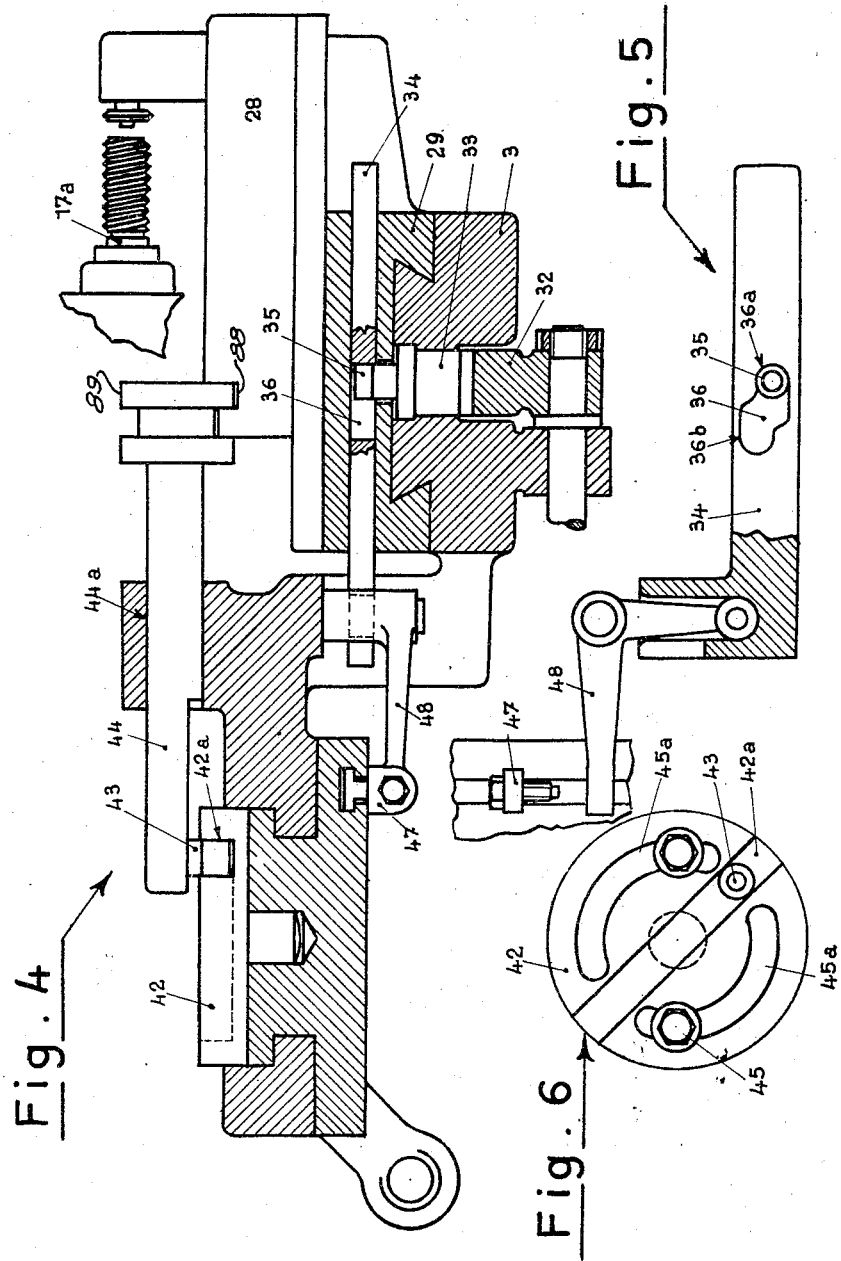

April 29, 1947.　　　　　E. BODMER　　　　　2,419,704
DEVICE FOR AUTOMATIC LATHE
Filed Aug. 26, 1943　　　　　5 Sheets-Sheet 5

Patented Apr. 29, 1947

2,419,704

UNITED STATES PATENT OFFICE 2,419,704

DEVICE FOR AUTOMATIC LATHES

Ernest Bodmer, Geneva, Switzerland

Application August 26, 1943, Serial No. 500,129
In Switzerland June 20, 1942

5 Claims. (Cl. 82—24)

Automatic lathes are generally equipped with several tool-holders arranged as a star about the spindle, according to radial planes passing through the center of it. Many lathes are moreover equipped with a turret-shaped tool-holder, working in the axis of the spindle.

Among the several tool-holders disposed in a fan-like position about a spindle, three main different tool-holders are to be mentioned:

(a) A tool-holder for performing turning-off work or traversing work, arranged on the front guide way of the bench of a lathe and equipped with two cross slides, it being possible to provide this tool-holder with accessory apparatus such as copying devices and screw thread cutting contrivances;

(b) A cross or surfacing tool-holder, arranged on the rear guide way of the lathe bench and equipped with two cross slides;

(c) A parting or cutting tool-holder, arranged vertically and resting against the face of the fast head stock. This tool-holder is fitted with one single slide, the translation motion of which is performed in a plane perpendicular to the axis of the spindle.

Some designers have provided auxiliary tool-holders placed between the three above mentioned tool-holders.

These auxiliary tool-holders are provided for performing surfacing work which require small strains.

Such lathes permit the performance of operations involving heavy strains such as bearing or transverse operations in which the front tool-holder is employed, and parting or cutting operations in which the rear tool-holder is utilized. The auxiliary tool-holders are used on work in which strains of a lesser degree are encountered such as, for example, in chamfering operations.

It is possible to perform a rough traversing operation by means of the front tool-holder, and a finishing traversing operation by means of the rear tool-holder. In this case, however, it is no longer possible to perform a parting or cutting off operation requiring a great strain.

It is also possible to cut a screw thread by means of the front tool-holder controlled by a screw-cutting contrivance, or a cone by means of this tool-holder controlled by a copying contrivance. In these cases, the rear tool-holder may either perform a parting or cutting-off operation, or the roughing out of a bearing surface, but it is no longer possible to perform two operations requiring great strains.

The present invention embodies a device for an automatic lathe equipped with, at least one tool-holder for performing a turning off or traversing operation and a tool-holder for a parting or cutting off operation. The device eliminates the mentioned inconveniences inasmuch as it is equipped with an auxiliary turning off or traversing tool-holder with cross slides, controlled independently of the other tool-holders of the lathe and fixed on a support fastened to the lathe, this support being arranged with regard to the other tool-holders, in such a way that the auxiliary tool-holder might be used simultaneously with any one of these mentioned tool-holders.

The here attached drawing shows, by way of example only, two forms of embodiment of the device for an automatic lathe, referring to the present invention.

Fig. 3 is a detailed view;

Fig. 4 is a detailed partial sectional view according to the line III—III of Fig. 2 and the line C—C of Fig. 8;

Fig. 5 is a detailed view with parts in section.

Fig. 6 is a front view of the guide;

Figure 1:
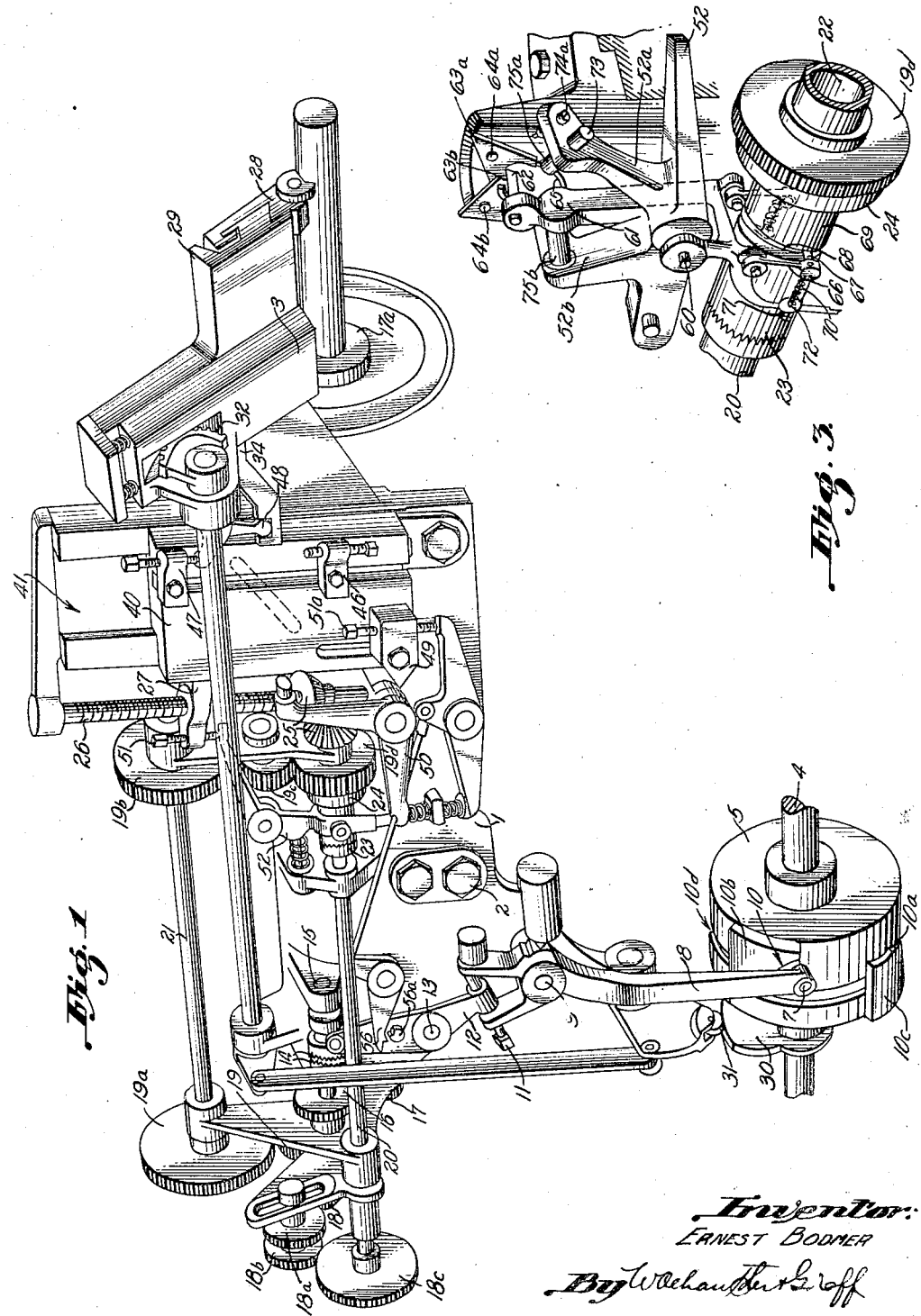
Fig. 1 is a perspective view of one embodiment.
Figure 2:
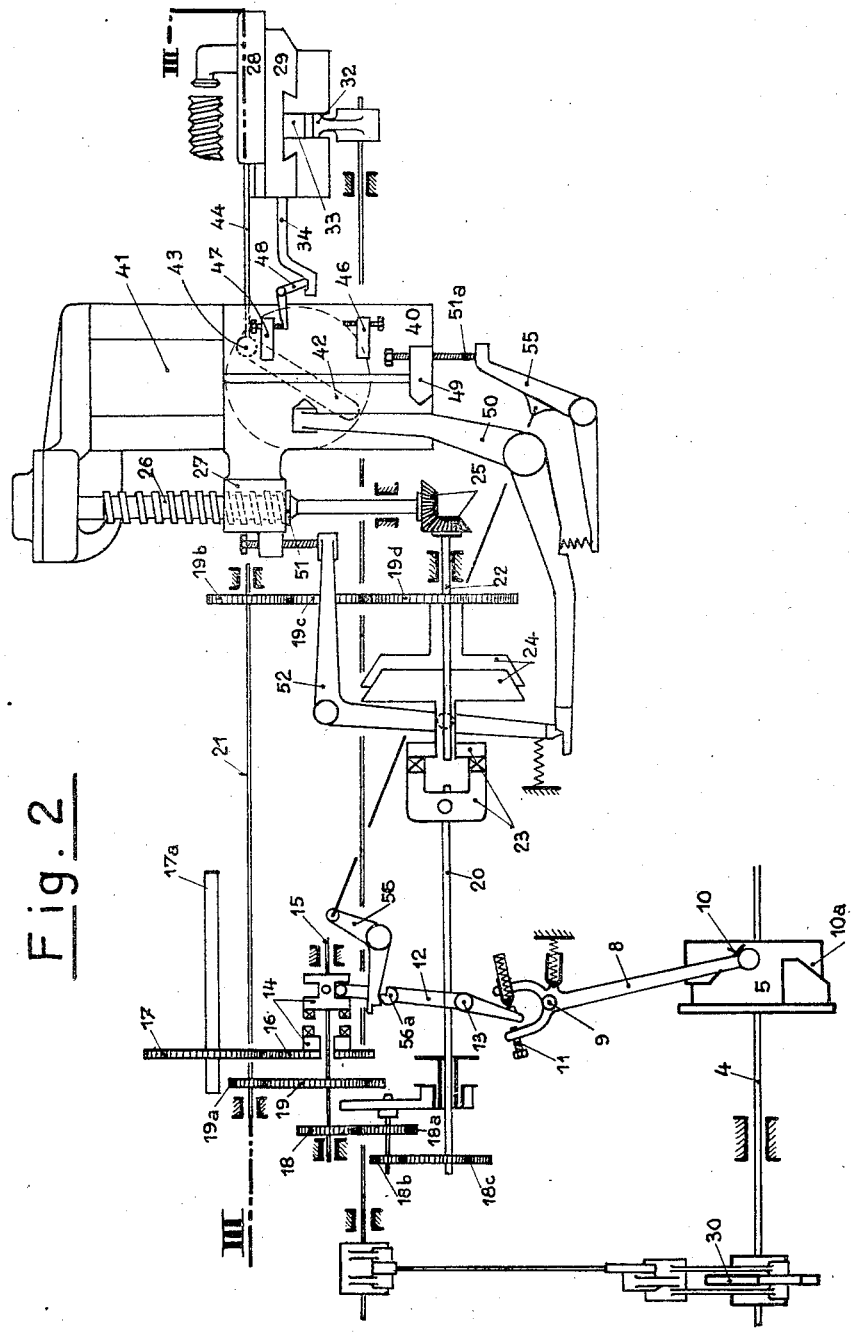
Fig. 2 is a diagrammatic representation of the device shown in Figure 1.

In the embodiment illustrated in Figs. 1 and 2, the device is arranged as a thread-cutting contrivance. It has a frame 1 intended to be fixed on the bed of the lathe by means of fastening elements 2. This frame is equipped with a support 3 for a tool-holder arranged on cross-slides, as well as the necessary elements for controlling the motion of the tool-holder for cutting screw threads. The starting of the screw-cutting device is controlled, according to known devices, by a cam 5 arranged on a cam shaft 4 of the lathe.

A reciprocating lever 8 with two rest positions, bears a finger 7 which engages against the cam faces 10 and 10a of the cam 5. Each of the cam faces 10 and 10a is formed from one of the faces of adjustable dogs 10b and 10c. These dogs are fixed in their actually required position by known devices. The cam face 10, upon rotation of the shaft 4, engages the finger 7 which is rigidly secured to the bifurcated lever 8 and rotates the lever 8 in a clockwise direction about its pivotal axle 9. An element 11, adjustable in its position, is fastened on one of the arms of the lever 8, and acts on a lever 12 pivoted on 13 on the frame 1.

The oscillation of this lever 12 causes the throwing in of both parts of a clutch 14, one part of which is fixed on an axle 15 whereas the other one is fastened to a toothed wheel 16 mounted loose on this axle 15. This toothed wheel 16 is engaged by a toothed wheel 17 fixed on the spindle 17a of the lathe. On the axle 15 there are also fixed two toothed wheels 18 and 19, the one 18 of which is in mesh with a set of interchangeable toothed wheels 18a—18b—18c whereas the other one 19 meshes with a toothed gear 19a fixed on a shaft 21. The toothed wheel 18c is fastened on a shaft 20 which carries one part of a clutch 23. The shaft 21 bears a second toothed wheel 19b controlling, by the intermediary of a toothed wheel 19c, a toothed wheel 19d mounted loose on a shaft 22. The sets of toothed wheels 18 and 19 are arranged in such a way that the toothed wheel 19d revolves in the reverse direction of the toothed wheel 18c.

The shaft 22 bears both female parts of the two clutches 23 and 24, the male parts being respectively fastened on the shaft 20 and on the wheel 19d, so that, by the working of these two clutches, the shaft 22 can be rotated in either direction. This shaft 22 controls, by the intermediary of beveled gears 25, an accurate lead screw 26. A nut 27, in mesh with the lead screw 26, controls the longitudinal motion of a longitudinal slide 28 of the tool-holder.

The set of change wheels 18, 18a, 18b, 18c causes the rather slow rotation motion of the lead screw for controlling the working stroke of the slide 28; the set of toothed wheels 19, 19a, 19b, 19c, 19d on the contrary causes the quick rotation of the lead screw for controlling the return motion of the slide 28.

A cross slide 29 is controlled by a cam 30 fixed on the cam shaft 4. A roller 31 rolls on this cam and its motions are transmitted by controlling rods to a toothed sector 32 in mesh with a rack 33 (Fig. 8) located within the support 3. This rack is fitted with a pin 35 (Fig. 5) penetrating into a cam opening 36 of a flat piece 34 mounted into a slide of the carriage 29. This flat piece 34 can be displaced axially as a flat bolt, so that the pin 35 rests either on the part 36a of cam opening 36 (released position of the tool) or on the part 36b (Fig. 5) (working position of the tool).

At the end of each intermediate work stroke and return stroke, stops 46 and 47 operate on bell crank 48 and flat piece 34 and pin 35 and radially displace slide 29 to raise it substantially away from the work or lower it into contact with the work. After each work stroke, cam shaft 4 advances cam 30 to a position to raise roller 31 and its connecting rods and cause toothed sector 32 to move rack 33 and slide 29 radially a little closer to the work piece to a sufficient depth so that the tool will take off another cut of metal.

The nut 27 controls the slide 28 by the intermediary of adjustable transmission elements provided to modify the transmission ratio of the motions between the nut 27 and the slide 28.

To this effect, the nut 27 is fastened on a slide 40 sliding in a slot 41 of the frame 1. The motion of this slide is at a right angle to the motion of the slide 28. This slide bears a guide 42 which can be angularly adjusted (Figs. 4 and 6) and is provided with an inclined plane constituted by one of the edges of a slot 42a in which a finger 43 slides, the finger 43 being fixedly secured to a rod 44 adapted to reciprocate in the aperture 44a in the frame 1. Hence, the rod 44 may be axially displaced and when moved causes a corresponding movement of the slide 28 whose motion axis in parallel thereto. Slide 28 has a transverse groove 88 (Fig. 4) in which displaceably fits an engaging member 89 terminally carried by rod 44 and which communicates the movements of rod 44 to slide 28 without preventing radial displacement of slide 28. The guide 42 is fixed on the slide 40 by means of two screws 45 which traverse slots 45a arranged in the form of circular arcs embodied in the base of the guide, in order to allow to tilt the guide 42 at the desired angle with respect to the motion of the pushing rod 44.

The threaded holes formed in the slide 40 and intended to receive the screws 45, are arranged on a straight line disposed at 90° with regard to the motion axis of the slide.

The slots in the form of circular arcs 45a are arranged symmetrically with regard to the slot 42a and have an angular length of about 135°.

Adjustable stops 46 and 47 mounted on the slide 40, are intended for controlling by means of a bell crank lever 48, the flat piece 34, in order to cause the engaging of the tool at the end of the return stroke and its release at the end of the working stroke. Flat piece 34 is provided at its ends adjacent bell crank lever 48 with a deep groove (Fig. 5) wherein slidably fits one end of bell crank 48, permitting sliding movement of flat piece 34 in the direction of its thickness along the end of bell crank 48.

An adjustable stop 49 mounted on the slide 40 is provided to effect the change in the rotation direction of the lead screw at the end of the working stroke of the tool. To this purpose the stop 49 acts on a lever 50 which controls simultaneously the throwing out of gear of the clutch 23 and the throwing in of the clutch 24.

Adjustable stops 51 and 51a, also mounted on the slide 40, are intended to cause the reversing of the rotation motion of the lead screw 26 at the end of the return stroke of the tool, as well as the automatic stopping of the whole device when the screw thread cutting operation is completed.

To this purpose, the stop 51 acts at the end of the return stroke on a lever 52, in such a way as to cause simultaneously the throwing out of gear of the clutch 24 and the throwing in of gear of the clutch 23.

An arm of bell crank lever 52 slottedly engages a pin carried by shaft 22 which carries the female parts of both clutch 23 and clutch 24 and this arm of bell crank lever 52 is spring-urged to normally open clutch 23 and close clutch 24, but when once set to close clutch 23 against the spring, is so held by a latch terminal on one arm of bell crank lever 50.

When nut 27 has travelled to its lowest position (Figure 2), it causes stop 51 carried by slide 40 to engage one arm of bell crank lever 52 and set clutch 23 closed, and at the same time causes stop 51a also carried on slide 40 to engage one end of bell crank lever 55 and cause the other end of lever 55 to apply pressure to the latch arm of bell crank lever 50 and cause its latch terminal to engage and lock the end of bell crank lever 52 and so hold clutch 23 engaged. When nut 27 and slide 40 have nearly reached the upper end of their travel (Fig. 2), stop 49 engages the stud on the upper end of bell crank lever 50 and throws the lower latch end of bell crank lever 50 out of engagement with the spring-urged end of bell crank lever 52 which permits the spring to urge lever 52 to open clutch 23 and close clutch 24.

At the end of each return stroke, the stop 51a acts on a lever 55 which, by an intermediary of a set of rods, acts on a lever 56. The extremity of this lever 56 thrusts against a pin 56a fixed on the lever 12. At each return of the slide 28 to the starting working position, the lever 56 is released from the pin 56a. However, the clutch 14 cannot be released, because the lever 12 is still maintained in position by the lever 8.

During the return of the tool to its initial working position, between successive runs, the cam 30 displaces the slide 29 in direction of the spindle in order that, when the tool engages, it cuts out a chip.

During the last return stroke of the tool, or during the last run, the cam face 10a thrusts against the finger 7, and moves the lever 8 to the position, shown on the drawing, so that the element 11 rests no longer on the extremity of the lever 12. Thus, when the stop 51a engages the lever 55 and rotates it about its pivotal point, the lever 56 is released from the pin 56a and the lever 12 becomes free and can be brought, under the action of a spring (not shown) to the position illustrated in the drawing. The displacement of the lever 12 throws out the clutch 14 and stops the further operation of the device.

It is clear that the pin 56a and the link 56 together with its cooperating kinematic connectors may be omitted, the stopping of the device being then dependent upon the control exercised by the cam face 10a at the end of the return stroke of the slide 28. Operation under the latter type of control is not however highly satisfactory as it is difficult to obtain the correct position of the slide 28 for commencing work on the next piece.

The sets of toothed wheels arranged between the spindle 17a bearing the workpiece and the shaft 20 are interchangeable, so as to effect a rotation speed ratio of both these two shafts which is approximately equal to the ratio existing between the pitch of the lead screw and the pitch of the screw thread to be cut. By tilting the guide 42 more or less with respect to the motion-axis to the pushing-rod 44, it is possible to modify the motion ratio between the nut 27 in mesh with the lead screw 26 and the longitudinal carriage 28 and thus to correct and eliminate the error of pitch due to the ratio of the rotation speeds of the spindle 17a and of the shaft 20, which, for some screw threads, cannot be taken equal to the ratio of the pitches.

As it appears, it is possible to give the guide 42a all the tilts, from its right angle position with respect to the motion-axis of the pushing-rod 44 up to a point substantially parallel to this axis. The motion ratio between the nut 27 and the pushing rod 44 can thus vary from zero up to a relatively large value. It is clear that both these extreme positions are not actually used; it is however interesting to note that, for the tilts as practically used, included within a tilt of 45° and the right angle position on the motion-axis of the pushing-rod 44, the motion ratio is smaller than 1. Consequently, by choosing a speed ratio between the spindle 17a and the shaft 20 equal to a multiple of the ratio between the pitch of the lead-screw and the screw thread to be obtained, and by tilting conveniently the guide 42a, it is possible to reduce in the same proportion the thrust of the nut 27 on the lead screw during the working of the tool, and thus to reduce the wear of the lead-screw.

Finally, as it appears from Fig. 6, the guide 42a can be tilted at an angle of more than 45° on each side of the perpendicular to the motion of the pushing rod 44. Thus, by simply setting the position of the guide, it is possible to invert the displacement direction of the slide 28. This means however a very substantial advantage as it is possible to work the same single screw thread by letting revolve the spindle in the right hand or left hand direction. To accomplish this operation it is only necessary to insert or to remove one supplementary toothed wheel between the wheels 17 and 16, according to the rotation direction of the spindle, in order to provide the slide 40 with the same displacement direction for the control of a working run and to avoid an inversion in the control. This fact confers on the lathe a much wider working possibility, since being no longer compelled to apply a given direction of rotation to the spindle for cutting a right hand or a left hand screw thread, it is possible to operate simultaneously with screw thread cutting, a turning off, a bearing work, or other operations.

The arrangement shown in Fig. 2 has some disadvantages. Thus, for an example, when the stop 51 acts on lever 52, it is possible that, after the releasing of the cone clutch 24, the inertia of the parts in rotation might not be sufficient in order that this stop 51 insures the meshing of both parts of the claw-clutch 23.

In order to eliminate this inconvenience, it is possible to employ a device having instantaneous motion in both displacement directions, and controlled by the stops 51 and 49. Many of these contrivances have been manufactured. In these devices, an element controlling the clutches is usually submitted to the action of an auxiliary control mechanism controlled, generally speaking, by springs. These latter might be put under tension, for example by the stop 51, and provided with a bolt to keep the control element of one of the clutches in one of their positions. At the end of the stroke, the stop 51 can release this element, which, under the action of the control mechanism, promotes the releasing of one of the clutches and the throwing in of the other one.

Such a device is shown in Fig. 3. The lever 52 is pivoted on an axle 60, fastened on the bed 1 and bears two arms 52a and 52b. An element 61 for controlling the clutches is pivoted on the axle 60 and consists of a lever 61, one arm of which is disposed between the arms 52a and 52b. This lever 61 is fitted with a pin 62 intended to work with a double bolt comprising two hooks 63a and 63b which are pivoted on a fixed part 64a and 64b. They are connected together by a spring 65, which tends to maintain the hooks downwardly, that is in contact with the pin 62.

The other end of this lever 61 is fork-shaped. On each arm of this fork are pivoted the levers 66, each of which are provided with a finger 67 penetrating into a groove 68 of a bush 69, this latter being fastened on the female parts of the clutches 23 and 24. Rods 70, adjustable in length, allow the maximum distance to be set between the extremity of the arms of the fork and the extremity of the levers 66. These rods 70 are rigidly fixed on the extremity of the levers 66 and slide into openings made on the extremities of the arms of lever 61. Nuts 71 allow for the adjustment of the length of the rods which are connected to the levers 66 for the releasing of the cone-clutch 24. Springs 72 tend to maintain the maximum distance apart between the extremity of the arms of the lever 61 and the extremities of the levers 66. Each arm 52a and 52b is provided on its extremity with a finger 75a—75b which latter is submitted to the action of a compression spring located each in a bushing 73a—73b. In addition these arms are provided with an adjustable stop 74a—74b, intended to release lever 61 by thrusting against the hooks 63a and 63b in order to compel them to rock at the required moment against the action of a spring 65.

This device works as follows:

The lever 52 is controlled either by the stop 51 at the end of the return stroke, or by the stop 49 throwing out latch lever 50 at the end of the working stroke.

In the position shown in Fig. 3, the clutch 23 is in thrown-in position; the tool makes, therefore, a working run. Somewhat before the end of the working run, the stop 49 acts under the lever 50 and tends to oscillate it in a counter-clockwise direction. The latch end of lever 50 releases lever 52 and finger 75a thrusts against the lever 61, and the action of the stop compresses the spring located within the bushing 73a. At the end of the working stroke, the stop 74a rocks the hook 63a which is in contact with the pin 62. This oscillation releases the hook and also releases the lever 61. This latter oscillates in a counter-clockwise direction, under the action of the spring located within the bushing 73a. This oscillation causes the release of the claw-clutch 23 and the throwing in of the cone clutch 24. The male and female parts of this clutch are brought in contact with each other by the intermediary of the spring 72, the lever 61 being maintained in position by the hook 63b in contact with the pin 62. At the end of the return stroke, the stop 51 acting on the lever 52 causes the reverse motion. The levers 66, instead of being pushed by the springs 72 are pulled by the rods 70.

It appears that due to this elastic connection between the levers 61 and the levers 66, it is possible to adjust very easily the specific pressure on the cone clutch, so as to obtain a positive carry of the shaft 22. Moreover, this elastic connection allows to compensate for the wear of the coupling and confers therefore to the whole device great working reliability.

Figure 7:
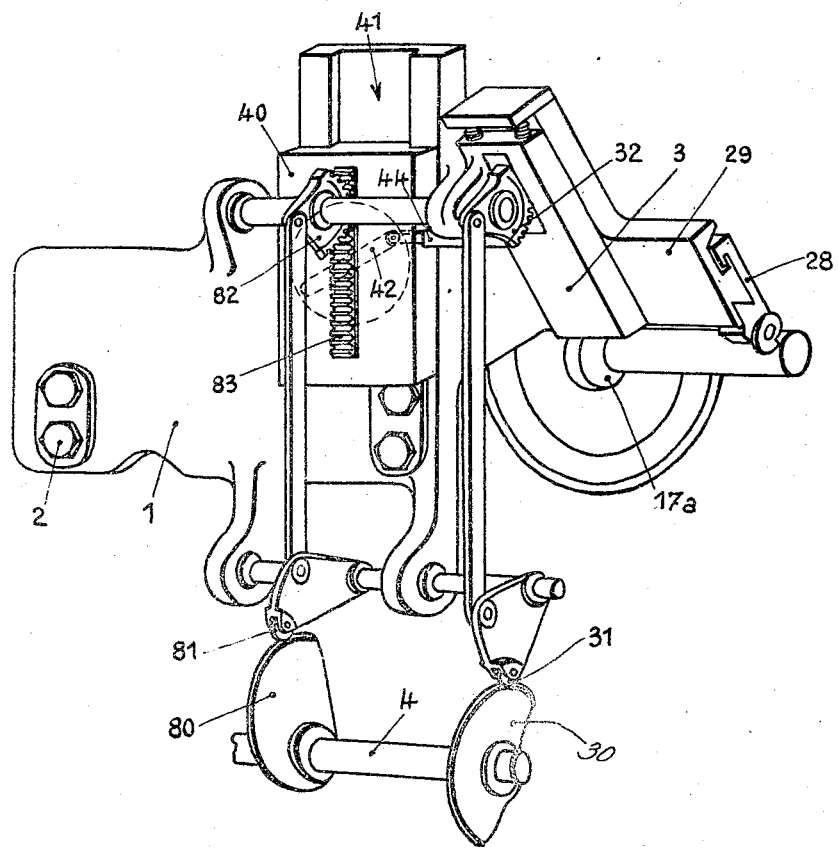
Fig. 7 is a perspective view of a second embodiment.

In the embodiment according to Fig. 7, the device for the lathe has been designed as a turning-off contrivance.

This device is, of course, very much simpler than the one shown in Fig. 1, because in this case, all the necessary controlling elements for cutting out the screw thread by several runs, can be omitted.

The frame 1 is fixed on the lathe by means of the screws 2. This frame is provided with a groove 41 in which a carriage 40 slides, this latter bearing the angularly adjustable guide 42. The motions of this carriage are controlled by a flat cam 80 secured to the cam shaft 4. This cam 80 has a spiral profile on which rolls a roller 81, the motions of which are transmitted to the carriage 40 by the intermediary of a set of rods controlling a toothed sector 82 in mesh with a rack 83 on the carriage 40.

As in the embodiment described above for Figs. 1–6, the slide 28 is controlled by the pushing rod 44, the finger 43 of which, fixed at its extremity, penetrates into the groove 42a of the guide 42.

Similarly the slide 29 is controlled by a cam 84 which is provided with a circular profile against which the roller 31 bears, the roller 31 being connected by a set of rods to the toothed sector 32 in mesh with the rack 33. This latter is fixed on the slide 29, the flat rod 34 of Fig. 1 being omitted.

Two embodiments of this invention have been described above and are offered merely as examples thereof; however, it is clear that other embodiments of the invention may be conceived which will fall within the scope of this invention.

It should especially be noted, that the control of the carriages of the tool-holders can be constructed according to actual requirements and may be adapted easily to different types of lathes.

This device being equipped with its own tool-holder, permits the disposition of an auxiliary tool-holder on the lathe which has been shown to have great advantages. In fact, due to this auxiliary tool-holder, it is possible to perform a supplementary turning off or traversing operation, the cutting of a screw thread and a traversing operation on the same workpiece, without it being necessary to use the rear tool-holder. This auxiliary tool-holder eliminates in many cases a re-setting operation. Thus great losses of time, due to the re-setting operation and manufacturing errors due to a lack of accuracy, when centering the workpiece during the re-setting operation, are eliminated.

This arrangement allows one to use the auxiliary tool-holder simultaneously with any other tool-holder of the lathe. Moreover, each carriage of the auxiliary tool-holder being controlled quite independently of the other tool-holders of the lathe, the setting in the working position of the auxiliary tool-holder as well as the feed of this latter can be started at the very moment required during several working operations to which the workpiece is submitted.

It is to be noted, that, in its inoperative position, the auxiliary tool-holder is completely out of the way. In fact, the cross-slides are completely withdrawn and the traversing carriage is disposed in its working starting position. Consequently, in its inoperative position, this auxiliary tool-holder does not interfere in any way with the motion of the front and rear tool-holders AV and AR, nor with the motion of the vertical tool-holder V and of that of the turret (not shown).

Figure 8:
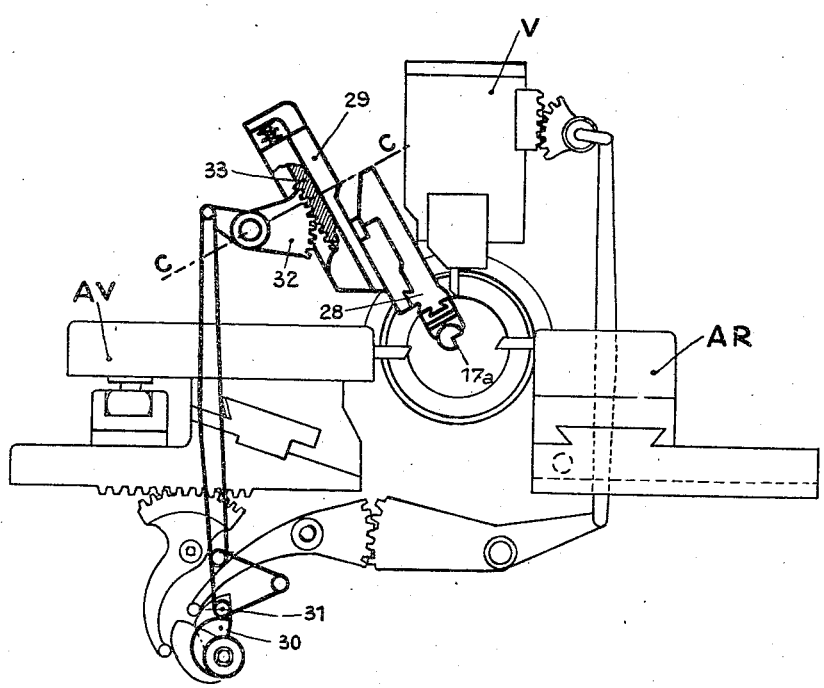
Fig. 8 is a view showing the arrangement of the slide bearing the tool-holder with respect to the spindle and to the other tool-holders of the lathe.

In Fig. 8, the main tool-holders of the lathe are shown, that is, the front tool-holder AV, the rear tool-holder AR and the vertical tool-holder V.

As a matter of fact, the lathe can also be equipped with auxiliary parting, surfacing or cutting off tool-holders to permit, for example, the performance of chamfering work.

I claim:

1. In an attachment for an automatic lathe having a work spindle and including a support, an auxiliary tool holder, a longitudinal slide and a radial slide for slidably mounting said tool holder on said support adjacent said work spindle and moving said holder respectively parallel or perpendicular with reference to said spindle, displacing means displaceable between two terminal positions, first connecting means connecting said displacing means to said longitudinal slide, controllably reversable motion transmitting means driven by said work spindle and adapted to selectively continuously transmit to said displacing means motion in either of two opposite directions, and second connecting means actuatable into one of two different actuating positions by arrival of said displacing means into one of its said terminal positions and adapted in its said two positions to respectively lift said radial slide and said tool holder radially away clear from the work piece during return longitudinal movement of said tool holder or to move said radial slide and said tool holder radially toward and into working position with the work piece during the cutting stroke of said tool holder, and means actuatable by arrival of said displacing means in its terminal positions for reversing the direction of motion transmitted by said reversable motion transmitting means to said displacing means.

2. In an attachment for an automatic lathe having a work spindle and including a support, an auxiliary tool holder, a longitudinal slide and a radial slide for slidably mounting said tool holder on said support adjacent said work spindle and moving said holder respectively parallel or perpendicular with reference to said spindle, displacing means displaceable between two terminal positions, first connecting means connecting said displacing means to said longitudinal slide, controllably reversable motion transmitting means driven by said work spindle and adapted to selectively continuously transmit to said displacing means motion in either of two opposite directions, second connecting means actuatable into one of two different actuating positions by arrival of said displacing means into one of its said terminal positions and adapted in its said two positions to respectively lift said radial slide and said tool holder radially away clear from the work piece during return longitudinal movement of said tool holder or to move said radial slide and said tool holder radially toward and into working position with the work piece during the cutting stroke of said tool holder, means actuatable by arrival of said displacing means in its terminal positions for reversing the direction of motion transmitted by said reversable motion transmitting means to said displacing means, a cam shaft driven by said work spindle, a cam carried on said cam shaft, and radial slide motion transmitting means actuatable by said cam and connected to said radial slide and adapted upon return of said tool holder to the initial point of its cutting stroke to radially advance the position of said radial slide through a distance corresponding to the depth of metal cut on one cutting stroke, so that the cutting tool continues to cut metal on successive cutting strokes.

3. In an attachment for an automatic lathe having a work spindle and including a support, an auxiliary tool holder, a longitudinal slide and a radial slide for slidably mounting said tool holder on said support adjacent said work spindle and moving said holder respectively parallel or perpendicular with reference to said spindle, displacing means displaceable between two terminal positions, first connecting means connecting said displacing means to said longitudinal slide, controllably reversable motion transmitting means driven by said work spindle and adapted to selectively continuously transmit to said displacing means motion in either of two opposite directions, second connecting means actuatable into one of two different actuating positions by arrival of said displacing means into one of its said terminal positions and adapted in its said two positions to respectively lift said radial slide and said tool holder radially away clear from the work piece during return longitudinal movement of said tool holder or to move said radial slide and said tool holder radially toward and into working position with the work piece during the cutting stroke of said tool holder, means actuatable by arrival of said displacing means in its terminal positions for reversing the direction of motion transmitted by said reversable motion transmitting means to said displacing means, a cam shaft driven by said work spindle, a first cam carried on said cam shaft, radial slide motion transmitting means actuatable by said cam and connected to said radial slide and adapted upon return of said tool holder to the initial point of its cutting stroke to radially advance the position of said radial slide through a distance corresponding to the depth of metal cut on one cutting stroke, so that the cutting tool continues to cut metal on successive cutting strokes, a second cam carried on said cam shaft, and disconnecting means actuatable by arrival of said second cam into a predetermined work termination position and by arrival of said displacing means into a terminal position thereof for disconnecting said reversable motion transmitting means from said work spindle.

4. In an attachment for an automatic lathe having a work spindle and including a support, an auxiliary tool holder, a longitudinal slide and a radial slide for slidably mounting said tool holder on said support adjacent said work spindle and moving said holder respectively parallel or perpendicular with reference to said spindle, displacing means displaceable between two terminal positions, first connecting means connecting said displacing means to said longitudinal slide, controllably reversable motion transmitting means driven by said work spindle and adapted to selectively continuously transmit to said displacing means motion in either of two opposite directions, second connecting means actuatable into one of two different actuating positions by arrival of said displacing means into one of its said terminal positions and adapted in its said two positions to respectively lift said radial slide and said tool holder radially away clear from the work piece during return longitudinal movement of said tool holder or to move said radial slide and said tool holder radially toward and into working position with the work piece during the cutting stroke of said tool holder, and means actuatable by arrival of said displacing means in its terminal positions for reversing the direction of motion transmitted by said reversable motion transmitting means to said displacing means, said second connecting means comprising a bar actuated by said displacing means and having a cam surface, and a pin carried by said radial slide and engageable with said cam surface of said bar for moving said radial slide and said tool holder outwardly away and free of the work piece on the return stroke of said tool holder or for moving said radial slide inwardly toward the work pieces on the cutting stroke of said tool holder.

5. In an attachment for an automatic lathe having a work spindle and including a support, an auxiliary tool holder, a longitudinal slide and a radial slide for slidably mounting said tool holder on said support adjacent said work spindle and moving said holder respectively parallel or perpendicular with reference to said spindle, displacing means displaceable between two terminal positions, first connecting means connecting said displacing means to said longitudinal slide, controllably reversable motion transmitting means driven by said work spindle and adapted to selectively continuously transmit to said displacing means motion in either of two opposite directions, second connecting means actuatable into one of two different actuating positions by arrival of said displacing means into one of its said terminal positions and adapted in its said two positions to respectively lift said radial slide and said tool holder radially away clear from the work piece during return longitudinal movement of said tool holder or to move said radial slide and said tool holder radially toward and into working position with the work piece during the cutting stroke of said tool holder, means actuatable by arrival of said displacing means in its terminal positions for reversing the direction of motion transmitted by said reversable motion transmitting means to said displacing means, a cam shaft driven by said work spindle, a cam carried on said cam shaft, and radial slide motion transmitting means actuatable by said cam and connected to said radial slide and adapted upon return of said tool holder to the initial point of its cutting stroke to radially advance the position of said radial slide through a distance corresponding to the depth of metal cut on one cutting stroke, so that the cutting tool continues to cut metal on successive cutting strokes, said radial motion transmitting means comprising a toothed sector controlled by said cam carried by said cam shaft and further comprising a rack carried by said radial slide and engageable with said sector.

ERNEST BODMER.

REFERENCES CITED

The following references are of record in the file of this patent:

UNITED STATES PATENTS

| Number | Name | Date |
|---|---|---|
| 1,219,813 | Flanders | Mar. 20, 1917 |
| 1,242,583 | Newton et al. | Oct. 9, 1917 |
| 1,248,317 | Groene et al. | Nov. 27, 1917 |
| 1,420,683 | Bright | June 27, 1922 |
| 1,679,043 | Lovely | July 31, 1928 |
| 1,639,090 | Johnson | Aug. 16, 1927 |
| 1,865,527 | Lovely | July 5, 1932 |
| 1,647,368 | Lovely | Nov. 1, 1927 |
| 1,797,704 | Svenson | Mar. 24, 1931 |
| 2,343,914 | Lloyd | Mar. 14, 1944 |

FOREIGN PATENTS

| Number | Country | Date |
|---|---|---|
| 521,759 | Britain | May 30, 1940 |